US010055409B2

(12) United States Patent
Von Weihe

(10) Patent No.: US 10,055,409 B2
(45) Date of Patent: *Aug. 21, 2018

(54) METHOD AND SYSTEM FOR DOCUMENT RETRIEVAL WITH SELECTIVE DOCUMENT COMPARISON

(71) Applicant: Workshare, Ltd., London (GB)

(72) Inventor: Daniel Von Weihe, London (GB)

(73) Assignee: Workshare, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,523

(22) Filed: Aug. 18, 2015

(65) Prior Publication Data

US 2016/0085752 A1 Mar. 24, 2016

Related U.S. Application Data

(63) Continuation of application No. 13/803,231, filed on Mar. 14, 2013, now Pat. No. 9,170,990.

(51) Int. Cl.
*G06F 17/30* (2006.01)
*G06F 17/22* (2006.01)

(52) U.S. Cl.
CPC .... *G06F 17/30011* (2013.01); *G06F 17/2247* (2013.01); *G06F 17/2288* (2013.01); *G06F 17/30368* (2013.01); *G06F 17/30554* (2013.01)

(58) Field of Classification Search
CPC .............. G06F 17/2288; G06F 17/30011
See application file for complete search history.

(56) References Cited

U.S. PATENT DOCUMENTS

| 6,128,635 | A | 10/2000 | Ikeno |
| 6,556,982 | B1 | 4/2003 | McGaffey et al. |
| 6,560,620 | B1 | 5/2003 | Ching |
| 6,591,289 | B1 | 7/2003 | Britton |
| 6,745,024 | B1 | 6/2004 | DeJaco et al. |
| 7,085,735 | B1 | 8/2006 | Hall et al. |
| 7,194,761 | B1 | 3/2007 | Champagne |
| 7,321,864 | B1 | 1/2008 | Gendler |
| 7,673,324 | B2 | 3/2010 | Tirosh et al. |
| 7,685,298 | B2 | 3/2010 | Day |
| 7,707,153 | B1 | 4/2010 | Petito et al. |
| 7,788,235 | B1 | 8/2010 | Yeo |
| 7,797,724 | B2 | 9/2010 | Calvin |

(Continued)

OTHER PUBLICATIONS

Bettenburg et al., An Empirical Study on the Risks of Using Off-the-Shelf Techniques for Processing Mailing List Data, 2009, IEEE 4 pages.

(Continued)

*Primary Examiner* — Hung Q Pham
(74) *Attorney, Agent, or Firm* — Sabety + Associates, PLLC; Ted Sabety

(57) ABSTRACT

This invention discloses a novel system and method for displaying electronic documents on remote devices and enabling collaborative editing where the system upon a request by a user to access a document, automatically determines the latest version of a document that the person had accessed and also whether a newer version had been created. The invention also merges parallel changes that have not been viewed by the user into the comparison result. The invention also includes running a comparison on the two versions and presenting the result to the user.

16 Claims, 4 Drawing Sheets

(56) References Cited

U.S. PATENT DOCUMENTS

| | | | |
|---|---|---|---|
| 7,818,678 | B2 | 10/2010 | Massand |
| 7,958,101 | B1 | 6/2011 | Teugels et al. |
| 8,117,225 | B1 | 2/2012 | Zilka |
| 8,181,036 | B1 | 5/2012 | Nachenberg |
| 8,316,237 | B1 | 11/2012 | Felsher et al. |
| 8,732,127 | B1 | 5/2014 | Rotterdam et al. |
| 8,839,100 | B1 | 9/2014 | Donald |
| 9,652,485 | B1 | 5/2017 | Bhargava et al. |
| 2001/0042073 | A1 | 11/2001 | Saether et al. |
| 2002/0016959 | A1 | 2/2002 | Barton et al. |
| 2002/0120648 | A1 * | 8/2002 | Ball ............... G06F 17/30899 715/234 |
| 2002/0138744 | A1 | 9/2002 | Schleicher et al. |
| 2003/0009518 | A1 | 1/2003 | Harrow et al. |
| 2003/0051054 | A1 | 3/2003 | Redlich et al. |
| 2003/0078880 | A1 | 4/2003 | Alley et al. |
| 2003/0093755 | A1 | 5/2003 | Ramakrishnan |
| 2003/0097454 | A1 | 5/2003 | Yamakawa et al. |
| 2003/0191799 | A1 | 10/2003 | Araujo et al. |
| 2003/0196087 | A1 | 10/2003 | Stringer et al. |
| 2003/0237047 | A1 | 12/2003 | Borson |
| 2004/0031052 | A1 | 2/2004 | Wannamaker et al. |
| 2004/0187076 | A1 | 9/2004 | Ki |
| 2005/0055306 | A1 | 3/2005 | Miller et al. |
| 2005/0055337 | A1 | 3/2005 | Bebo et al. |
| 2005/0071755 | A1 | 3/2005 | Harrington et al. |
| 2005/0108293 | A1 | 5/2005 | Lipman et al. |
| 2005/0204008 | A1 | 9/2005 | Shinbrood |
| 2005/0268327 | A1 | 12/2005 | Starikov |
| 2006/0005247 | A1 | 1/2006 | Zhang et al. |
| 2006/0047765 | A1 | 3/2006 | Mizoi et al. |
| 2006/0069740 | A1 | 3/2006 | Ando |
| 2006/0129627 | A1 | 6/2006 | Phillips |
| 2006/0158676 | A1 | 7/2006 | Hamada |
| 2006/0184505 | A1 | 8/2006 | Kedem |
| 2006/0218643 | A1 | 9/2006 | DeYoung |
| 2006/0224589 | A1 | 10/2006 | Rowney |
| 2006/0272024 | A1 | 11/2006 | Huang et al. |
| 2007/0094510 | A1 | 4/2007 | Ross et al. |
| 2007/0100991 | A1 | 5/2007 | Daniels et al. |
| 2007/0150443 | A1 | 6/2007 | Bergholz et al. |
| 2007/0179967 | A1 | 8/2007 | Zhang |
| 2007/0220068 | A1 | 9/2007 | Thompson et al. |
| 2007/0261099 | A1 | 11/2007 | Broussard et al. |
| 2007/0299880 | A1 | 12/2007 | Kawabe et al. |
| 2008/0022003 | A1 | 1/2008 | Alve |
| 2008/0034282 | A1 | 2/2008 | Zernik |
| 2008/0065668 | A1 | 3/2008 | Spence et al. |
| 2008/0091465 | A1 | 4/2008 | Fuschino et al. |
| 2008/0091735 | A1 | 4/2008 | Fukushima et al. |
| 2008/0162527 | A1 | 7/2008 | Pizano et al. |
| 2008/0177782 | A1 * | 7/2008 | Poston ............... G06F 17/2288 |
| 2008/0209001 | A1 | 8/2008 | Boyle et al. |
| 2008/0235760 | A1 | 9/2008 | Broussard et al. |
| 2008/0263363 | A1 | 10/2008 | Jueneman et al. |
| 2008/0288597 | A1 | 11/2008 | Christensen et al. |
| 2008/0306894 | A1 | 12/2008 | Rajkumar et al. |
| 2009/0025087 | A1 | 1/2009 | Peirson et al. |
| 2009/0049132 | A1 | 2/2009 | Gutovski |
| 2009/0083073 | A1 | 3/2009 | Mehta et al. |
| 2009/0164427 | A1 | 6/2009 | Shields et al. |
| 2009/0183257 | A1 | 7/2009 | Prahalad |
| 2009/0319480 | A1 | 12/2009 | Saito |
| 2010/0011428 | A1 | 1/2010 | Atwood et al. |
| 2010/0049807 | A1 | 2/2010 | Thompson |
| 2010/0058053 | A1 | 3/2010 | Wood et al. |
| 2010/0064004 | A1 | 3/2010 | Ravi et al. |
| 2010/0076985 | A1 | 3/2010 | Egnor |
| 2010/0131604 | A1 | 5/2010 | Portilla |
| 2010/0146382 | A1 | 6/2010 | Abe et al. |
| 2010/0186062 | A1 | 7/2010 | Banti et al. |
| 2010/0257352 | A1 | 10/2010 | Errico |
| 2010/0287246 | A1 | 11/2010 | Klos et al. |
| 2010/0332428 | A1 | 12/2010 | McHenry et al. |
| 2011/0029625 | A1 | 2/2011 | Cheng et al. |
| 2011/0041165 | A1 | 2/2011 | Bowen |
| 2011/0106892 | A1 | 5/2011 | Nelson et al. |
| 2011/0197121 | A1 | 8/2011 | Kletter |
| 2011/0225646 | A1 | 9/2011 | Crawford |
| 2011/0252098 | A1 | 10/2011 | Kumar |
| 2011/0252310 | A1 | 10/2011 | Rahaman et al. |
| 2011/0264907 | A1 | 10/2011 | Betz et al. |
| 2011/0314384 | A1 | 12/2011 | Lindgren et al. |
| 2012/0016867 | A1 * | 1/2012 | Clemm ............... G06F 17/2211 707/722 |
| 2012/0079267 | A1 | 3/2012 | Lee |
| 2012/0079596 | A1 | 3/2012 | Thomas et al. |
| 2012/0117644 | A1 | 5/2012 | Soeder |
| 2012/0246115 | A1 | 9/2012 | King et al. |
| 2012/0260188 | A1 | 10/2012 | Park et al. |
| 2013/0074195 | A1 | 3/2013 | Johnston et al. |
| 2013/0097421 | A1 | 4/2013 | Lim |
| 2013/0227043 | A1 | 8/2013 | Murakami |
| 2014/0115436 | A1 | 4/2014 | Beaver et al. |
| 2014/0181223 | A1 | 6/2014 | Homsany et al. |
| 2015/0026464 | A1 | 1/2015 | Hanner et al. |
| 2015/0172058 | A1 | 6/2015 | Follis |
| 2016/0350270 | A1 | 12/2016 | Nakazawa |

OTHER PUBLICATIONS

Bindu et al., Spam War: Battling Ham against Spam, 2011 IEEE 6 pages.

Bobba et al. Attribute-Based Messaging: Access Control and Confidentiality, 2010, ACM 35 pages.

Chen et al., Online Detection and Prevention of Phishing Attacks, 2006, IEEE 7 pages.

Karnouskos et al., Active Electronic Mail, 2002, ACM 6 pages.

Kaushik et al., Email Feedback: A Policy based Approach to Overcoming False Positives, 2005, 10 pages.

Stolfo et al., AMT?MET: Systems for Modeling and Detecting Errant Email. 2003, IEEE 6 pages.

\* cited by examiner

Document ID

| User ID 1 | Access Time Stamp | Version ID | W | File Pointer 1 |
|---|---|---|---|---|
| User ID 2 | Access Time Stamp | Version ID | W | File Pointer 2 |
| User ID 3 | Access Time Stamp | Version ID | R | File Pointer |
| | | | | |

Figure 2

METHOD AND SYSTEM FOR DOCUMENT RETRIEVAL WITH SELECTIVE DOCUMENT COMPARISON

This application claims priority as a continuation to U.S. patent application Ser. No. 13/803,231 filed on Mar. 14, 2013, which is hereby incorporated by reference in its entirety.

FIELD OF INVENTION

The present invention generally relates to the field of digital document review. More particularly, the present invention relates to methods and systems for detecting changes and/or differences between an original document and a modified version of the document.

BACKGROUND

In several scenarios, one or more users may go through multiple revisions of a document to improve the content and presentability of the document contents. As a result of their being more than one user authorized to access and modify a document, other users may become confused when requesting to see a document if they are not aware that the document has changed and how. In doing so, a user may wish to compare a latest version of the document with a prior version to determine the changes that have been made to the latest version. Other limitations of existing or prior systems will become apparent to those of skill in the art upon reading the following Detailed Description.

At least one embodiment of this invention pertains to a document management service that enables a user to request a document from the service to be delivered to a remote computer and have the service compare the last version of the document that the user accessed with the latest version and to deliver a display document showing those changes The document management service may run as a standalone service on a user's computing device or, in some instances, may run as a web service on a remote server. In either scenario, the document management service receives as input a request for particular document that a user wishes to see. The service determines whether the current version of the document supersedes the version of the document that the requesting user has previously seen. Subsequent to receiving the requests, the compare service generates a comparison document by identifying differences between the latest version of the document and the version that the requesting user has previously seen. The compare service delivers to the user's computer the comparison result. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

FIG. 2 is an example access history data table associated with a document.

DETAILED DESCRIPTION

Figure 1:
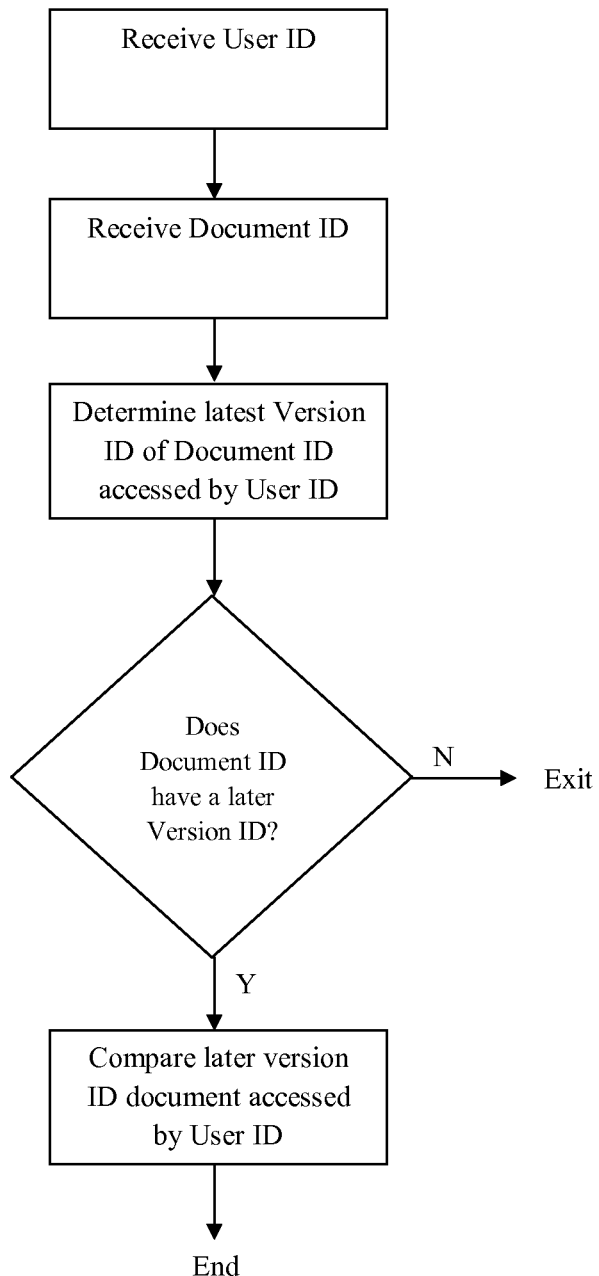
FIG. 1 is a flow chart depicting the basic architecture of the process.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The method and system operates on one or more computers, typically using one or more servers and one or more remote user's computing devices. A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works in conjunction with a document collaborative editing system (CES) or document management systems, (DMS) or both. For brevity, references to the DMS in the disclosure may disclose processes that may be performed by the CES or the CES in combination with the DMS. The system can be embodied in a client/server architecture, whereby an executable code operates on the user's remote device and interacts with processes operating on a server. In other embodiments, the same system can be running on the user's remote device by means of scripts or apps that are downloaded and executed within an Internet web-browser.

The user's remote computer is operatively connected to a data communication network, typically the Internet. This may be directly or indirectly through another network, for example a telephone network or a private data network. The user operates a client software on their computing device that communicates with the server that operates the process as a service, or the server that delivers documents for editing or review, that is the DMS or CES.

When the client requests to view a document available on the DMS, the request is received and processed on the DMS. In this case, the user's device may select a document title from a graphical user interface displayed on the screen of the device. The DMS maintains all of the revisions of the document in its data storage repository. Each time the CES saves a new version, that is a new computer file. That new file typically has a different filename than the prior version. The system also keeps track of the date and time that the version was stored. The system maintains a separate database that keeps track of each user authorized to access the document on the CES and their access of the document. For example, FIG. 2 shows a data table assigned to a given document, with a Document ID. That table shows a list of user ID's and then the time they accessed the document, which version of the document and whether it was for a read or a write. When a user with an identifier of USERID accesses the document referred to as DOCUMENT ID, then a new row in the table is created. That row is populated with the time stamp for the access, and which VERSION ID associated with the DOCUMENT ID was accessed. If the access was to read the document then the R/W flag is set to R. For each VERSION ID, there is a corresponding file pointer that refers to the data file containing that version of the document. While a simple data table is presented, other data structure organizations may be used to store the access history of the document.

This access history is used by the process to determine which revisions of the document a particular user has not seen.

Figure 3:
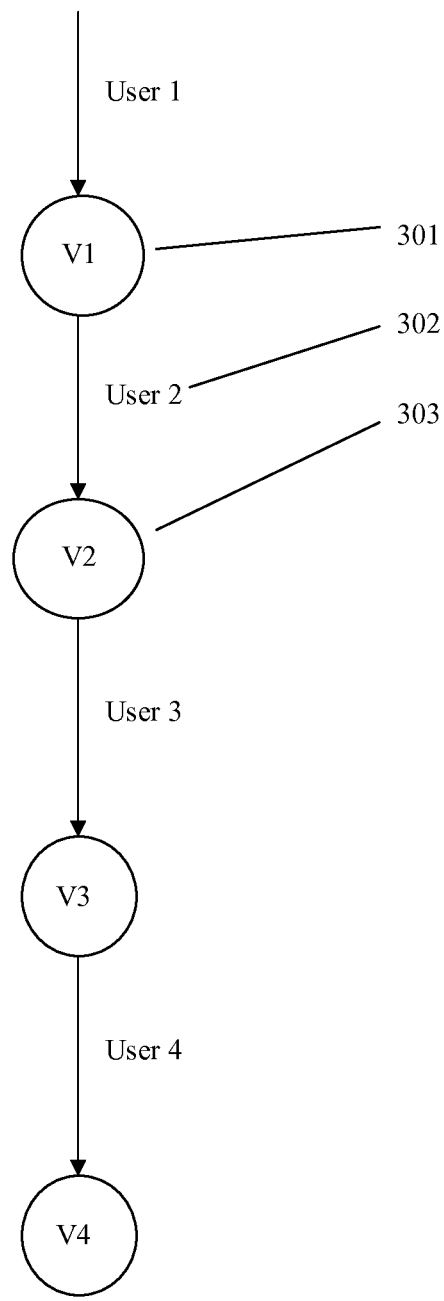
FIG. 3 is an example document revision history schematic
Figure 4:
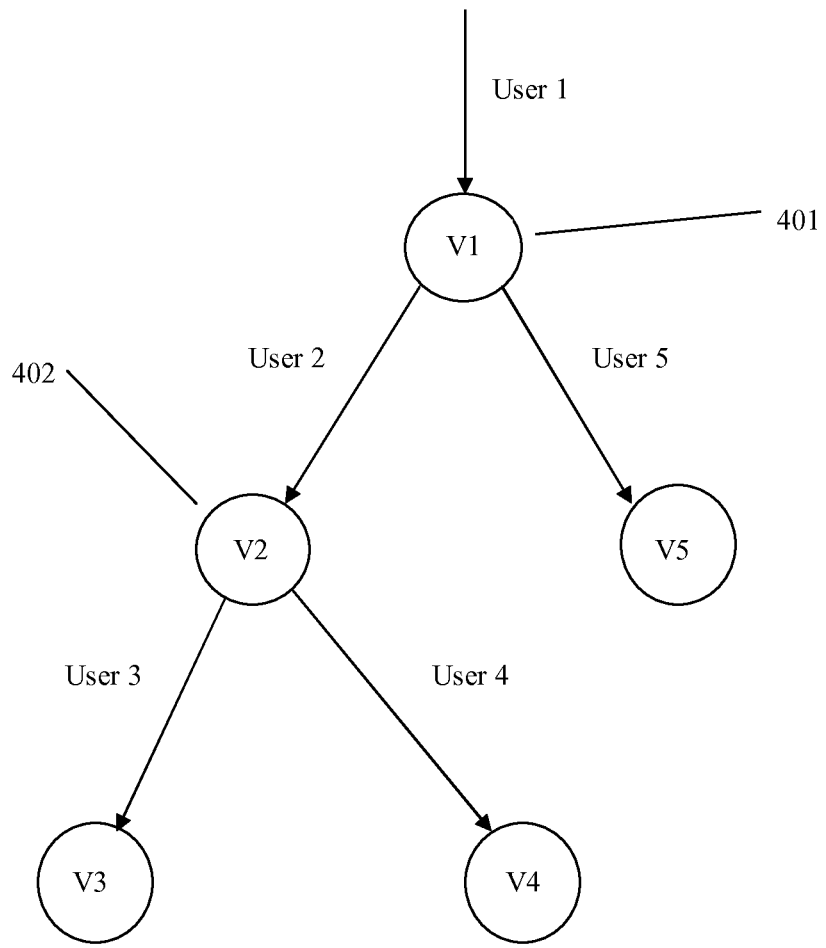
FIG. 4 is an example document revision history as a tree structure.

Returning to the user interface, the user can select a document to review by name. The system can then determine which version to deliver. For example, it may be that the user wishes to see the last version of the document they worked on. However, as shown in FIG. 3, in the case of a user 1, who creates a document and releases it into CES environment, that document may go through several revisions instituted by several people in the group. In this example, the document version 1 (301) gets revised by user 2 (302) who thereby creates version 2 of the document (303). FIG. 4 shows the situation where a document gets revised such that there are more than one sets of revision history. FIG. 2 shows how each version has a VERSIONID that can be stored in the activity database. So in the example of FIG. 3, the USER1 entry has a W entry on the creation of VERSION 1 of the document. In the next row, USER2 has an entry for the creation of VERSION 2 of the document. Similarly, other users can have entries showing that they accessed a particular version of the document for reading, which would be indicated by an R in the last column. A user may have more than one row in the table: this would indicate the user accessing the document an additional time.

In the typical system, the user logs into a CES using a username and password, or similar computer security mechanism. The CES confirms the identity of the user in typical fashion, for example, by looking in a database to obtain a password string corresponding to the username and confirming that they match. In any case, the system obtains a USERID for that user. Through a typical graphical user interface, the user can request to see a document. This can be by means of opening a directory listing, accessing a most recently used list, or using a typical document management system tool that lists documents associated with a client or project. As a result of such a request, the system then obtains a DOCUMENT ID. The DOCUMENT ID may be a filename or other identifier associated with the set of files constituting a document and its revisions, as indicated in FIGS. 3 and 4.

The system then uses the access history associated with the DOCUMENT ID to determine the latest VERSION ID that the user has accessed. As shown in FIG. 2, the system can search for the lowest row that the USERID can be found. Then it can retrieve from the table the VERSION ID. The system can then continue down the table rows looking for a newer VERSION ID. If one is found, then by definition, that VERSION ID is later than the one the user accessed. Otherwise, the same USERID would occupy that row. Practitioners will recognize that other data structures may be used to store the dependencies of the access history and other kinds of algorithms may be used to identify the last version that a user has accessed and whether there is a later version.

Upon determining the version of the document that the user last accessed and the latest version, the system can present the user the choice of either opening the older document, opening the newer document, or opening a comparison document that compares the later version of the document to the version the user had last seen. This last step requires running a comparison between the two versions of the document. Document comparison may be accomplished using a string matching algorithm, that is, one that begins trying to match the character strings in a document file to the character strings in the other document file. Document comparison can be further enhanced by ignoring certain characters, for example, spaces, new line characters and certain formatting characters. Document comparison can be even further enhanced by creating data structures out of the document text that model the document as a hierarchy of component paragraphs and sections, and comparing these first, to account for paragraphs being moved within the document, and then only showing comparisons of the text in the paragraph.

Once the compared document is presented to the user, the user can make changes to the document and save it as yet a newer version. In this case the system will generate a new data file comprising the new version is of the document is created and a new VERSION ID. When a new version of the document is created, it's a distinct document data file. The USERID, the new VERSION ID and the W entry are entered into the access history table. A pointer to the file is also included into the table. Alternatively, the user may simply read the document with no changes. In the first case, a new row entry is made in the access history table that indicates a new VERSION ID and a W (write) access and the file pointer to the new file. In the second case, the new row entry is made with the same VERSION ID entered and a R (read) access.

In one embodiment, the system works with a document where for any version of the document, there is one parent version and one child version, except for the first version and the last version. See FIG. 3. In this embodiment, the latest version of the document is the last in the series, that is, the newest version number or VERSION ID. In another embodiment, the system may have versions of the document where a document may have one parent, but more than one child version. This occurs when a version of the document is opened by two different users who then save their versions of the document as distinct versions. See FIG. 4.

In this second embodiment, there arises the determination of what the latest version of the document is, for the purposes of running the comparison. All of the candidate latest versions would appear as leaf nodes in the schematic shown in FIG. 4. Each node in the tree hierarchy represents a version of the document. Each edge linking the nodes represents a user that modified a parent version to create a child version. Selecting from this set can be accomplished in several ways, depending on the utility being sought.

1. The simplest approach is to select the VERSIONID with the latest time-stamp. In this case, the system will work down the access history table looking for the row. A W (write) in particular the row that has the latest access time stamp. The VERSION ID and file pointer for that row is used to retrieve the document.

2. Another approach is to consider the selection of the version akin to selecting a leaf node on the basis of the path from the initial version (or root node) to the leaf. In this case, the leaf node that is on a path that includes the requesting USERID can be selected. This would entail working through the access history keeping track of the hierarchical structure, typically by means of using a stack to process the hierarchical structure.

3. In yet another approach, the selection can be the leaf node that is the end point of a path that includes the originator of the document (other than the first or root version). In this case, the system looks for the path where an interim version was represented by a entry in the table where the USERID matches the USERID associated with the first VERSIONID.

4. In yet another approach, the selection can be the leaf node that is the endpoint of a path that includes a version created by a USERID associated with some pre-determined seniority value. In this example, the USERID of the version creator may be a senior manager that is determined to be sufficiently important as to have some predetermined value associated with their USERID. Each time the system tests a node, the system can retrieve this seniority value from a database that stores information about the USERID, and can compare that seniority value against some predetermined value. In yet another embodiment, the user making the request for the document can select or input the seniority value to be used for that comparison.

5. In yet another approach, the leaf node that is a member of a path that contains a version node that is associated with a preference value that meets a pre-determined value. For example, a senior manager in a document management system may select a version and input a selection that tells the system the "use this version". This value can be stored in another column of the access history table. However, that version may be revised again, in which case the leaf node that is downstream from that preferential selection may be the appropriate version to use for the comparison.

6. In yet another approach, the requesting user can select which of the leaf versions to use. In one embodiment, the system analyzes the access history data to determine which VERSION IDs have no child versions. The user interface presents a hierarchical structure, similar to FIG. 4, and the user can view for each node, the author of that version and its time stamp. From that presentation, the user can input a selection of one of the leaf nodes as the latest version for the comparison.

In yet another embodiment, the features disclosed herein can be arranged so that the system performs the following steps:

1. When a user opens a file from either the a web app or desktop application, and
 If there has been a new version of this file, and
  Posted by anyone other than this user, and
   Later in time than when the file was last viewed by this user, then
2. The system asks the user if they would like to see what's new in the file.
3. If the user's responds in the affirmative the system:
 Compares the last version they viewed with the most recent version, and
 Produces a comparison report that highlights the changes.
4. The user may then save, download, forward or comment on the comparison report.
5. If the user returns to the file view again from either user interface, and the version has not changed again, regardless of whether or not they ran the report on the previous visit, the system does not ask the user because the activity data indicates that they have now seen the latest version. In yet another embodiment, the system also determines whether the latest second version has at least one related version in the tree structure relationship where such related version is not an ancestor document to the second version, and in dependence thereon, selecting at least one of the related versions, merging the changes in the at least one related versions into the second latest version in order to cause the comparison presented to the requesting user to contain a compilation of the merged changes.

Operating Environment:

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multiprocessor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Further, a server may be virtual, whereby several software instances each operating as an independent server are housed in the same hardware computer. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method executed by a computer system comprised of a server computer and a remote computer operated by a user for providing a user operating the remote computer access to a document embodied in at least two versions stored on the server comprising:
   receiving from a user's remote device data representing a request for access to the document;
   by automatically inspecting a data structure stored on the server representing a revision history of the document, said data structure representing the revision history being organized in a tree-structure, making a first determination of a first version of the document that is the latest version that has been viewed by the user operating the remote device, making a second determination whether there is at least two second versions of the document that is represented by at least two corresponding leaf-nodes in the tree-structured data structure;
   in dependence on the second determination, transmitting a query to the remote computer, said query comprised of data representing references to the at least two second versions;
   receiving from the remote device a response to the query, said response comprised of a selection of one of the at least two second versions; and
   generating a comparison report between the first version and the selected one of the at least two second versions of the document.

2. The method of claim 1 where the comparison report is comprised of data representing highlights of the changes between the first version and the selected one of at least two second versions of the document.

3. The method of claim 2 further comprising:
   transmitting the comparison report to the remote device operated by the user; and
   updating a document access history data structure to indicate that the requesting user has viewed the selected one of at least two second versions of the document.

4. The method of claim 1 where the transmitting step is comprised of transmitting data representing a diagram of at least a portion of the revision history related to at least three versions of the document.

5. The method of claim 1 further comprising a determining using the tree structured data structure whether the selected one of at least two second versions of the document has an at least one related third versions where the at least one related third version is not an ancestor document in the revision history to the selected one of at least two second versions of the document, and in dependence on said determination, selecting one of the at least one related third versions, merging the changes in the selected at least one of the related third versions into the selected one of at least two second versions of the document in order to cause the comparison to contain a compilation of the merged changes.

6. The method of claim 1 where the second determination step is comprised of:
automatically selecting one of the at least two document versions represented by the two corresponding leaf nodes determining which of the two document versions associated with the two corresponding leaf nodes is an ancestor document version in the revision history that was a version saved by the user operating the remote device.

7. The method of claim 1 where the second determination step is comprised of:
automatically selecting one of the at least two document versions represented by the two corresponding leaf nodes by determining which of the two document versions associated with the two corresponding leaf nodes is an ancestor document version in the revision history that was saved by a user who is associated with a data parameter representing a seniority level above the seniority level of the user operating the remote device.

8. The method of claim 1 where the second determination step is comprised of:
automatically selecting one of the at least two document versions represented by the two corresponding leaf nodes by determining which of the two document versions associated with the two corresponding leaf nodes is an ancestor document version in the revision history that is associated with a stored data parameter that represents a designation of that document version as taking precedence over at least one other version of the document referred to in the revision history.

9. A computer system comprised of a server and a remote device for providing a user operating the remote computer access to a one version of a document embodied in at least two versions stored on the server comprising:
a component adapted by logic for receiving from a user's remote device data representing a request for access to the document;
a component adapted by logic for automatically inspecting a data structure stored on the server representing the revision history of the document organized as a tree-structure, making a first determination of a first version of the document that is the latest version that has been viewed by the user operating the remote device, and making a second determination whether there is at least two second versions of the document that are represented by at least two corresponding leaf-nodes in the tree-structured data structure;
a component adapted by logic for transmitting a query to the remote device in dependence on the second determination said query comprised of data representing references to the at least two second versions;
a component adapted by logic for receiving from the remote device a response to the query, said response comprised of a selection of one of the at least two second versions;
a component adapted by logic for, generating a comparison report between the first version and the selected one of the at least two second versions of the document.

10. The computer system of claim 9 further adapted by logic to generate the comparison report so that it is comprised of data that highlights the changes between the first version and the one of at least two selected second versions of the document.

11. The computer system of claim 10 further comprising:
a component adapted by logic for transmitting the comparison report to the remote device operated by the user; and
a component adapted by logic for updating a document access history data structure to indicate that the user operating the remote device has viewed the selected one of the at least two second versions of the document.

12. The system of claim 9 where the transmitting component is further adapted by logic to transmit data representing a diagram of at least a portion of the revision history related to at least three versions of the document.

13. The system of claim 9 further comprising a component adapted by logic to determine using the tree structured data structure whether the selected one of at least two second versions of the document has an at least one related third versions where the at least one related third version is not an ancestor document to the selected one of the at least one second versions of the document, and if it is determined that at least one related third version that is not an ancestor document exists, then select at least one of the determined related third versions, and merge the changes in the selected at least one related third versions into the selected one of at least one second versions of the document in order to cause the comparison transmitted to the remoted device to contain a compilation of the merged changes.

14. The system of claim 9 where the component adapted by logic for automatically inspecting a data structure is further adapted by logic to automatically select one of the at least two document versions represented by the two corresponding leaf nodes by determining which of the two document versions associated with the two corresponding leaf nodes is an ancestor document version in the revision history that was a version saved by the user operating the remote device.

15. The system of claim 9 where component adapted by logic for automatically inspecting a data structure is further adapted by logic to automatically select one of the at least two document versions represented by the two corresponding leaf nodes by determining which of the two document versions associated with the two corresponding leaf nodes is an ancestor document version in the revision history that was saved by a user who is associated with a data parameter representing a seniority level above the seniority level of the user operating the remote device.

16. The system of claim 9 where the component adapted by logic for automatically inspecting a data structure is further adapted by logic to automatically select one of the at least two document versions represented by the two corresponding leaf nodes by determining which of the two document versions associated with the two corresponding leaf nodes is an ancestor document version in the revision history-that is associated with a stored data parameter that represents a designation of that document version as taking precedence over at least one other version of the document referred to in the revision history.

\* \* \* \* \*